United States Patent

[11] 3,597,688

[72] Inventor Masaka Ogi
Tokyo, Japan
[21] Appl. No. 16,148
[22] Filed Mar. 3, 1970
[45] Patented Aug. 3, 1971
[73] Assignee Fujitsu Limited
Kawasaki, Japan
Continuation-in-part of application Ser. No. 603,386, Dec. 20, 1966, now abandoned.

[54] PCM TRANSMISSION SYSTEM UTILIZING ANALOG PHASE DISCRIMINATOR FOR BINARY CODE SIGNALS

2 Claims, 15 Drawing Figs.

[52] U.S. Cl. .......... 325/30, 325/38, 178/67
[51] Int. Cl. .......... H04l 27/18
[50] Field of Search .......... 325/30, 38, 163; 178/66, 67, 68

[56] References Cited

UNITED STATES PATENTS

| | | | |
|---|---|---|---|
| 3,032,745 | 5/1962 | Hamer | 178/66 X |
| 3,223,925 | 12/1965 | Florac Jr. et al. | 325/30 X |
| 3,349,181 | 10/1967 | Ito | 178/67 X |
| 3,378,637 | 4/1968 | Kawai et al. | 178/67 |

*Primary Examiner*—Robert L. Griffin
*Assistant Examiner*—James A. Brodsky
*Attorneys*—Curt M. Avery, Arthur E. Wilfond, Herbert L. Lerner and Daniel J. Tick

ABSTRACT: The transmitter of a PCM transmission system for transmitting binary code signals comprises a wave shaper for shaping binary pulses into a rectangular wave pulse train having positive pulses each having a pulse duration equal to the period from the leading edge of a corresponding one of the binary pulses coincident with the leading edge of the corresponding positive pulse to the leading edge of the next succeeding one of the binary pulses. A phase modulator phase modulates a carrier wave with the rectangular wave pulse train provided by the wave shaper to provide a phase shifted carrier which is then transmitted via wireless.

PATENTED AUG 3 1971 3,597,688

PCM TRANSMISSION SYSTEM UTILIZING ANALOG PHASE DISCRIMINATOR FOR BINARY CODE SIGNALS

The present application is a continuation-in-part of copending patent application Ser. No. 603,386, filed Dec. 20, 1966, now abandoned, for PCM Transmission System For Binary Code Signals, and assigned to the assignee of such copending patent application.

DESCRIPTION OF THE INVENTION

The present invention relates to a transmission system for transmitting binary code signals. More particularly, the invention relates to a pulse code modulation or PCM transmission system for transmitting binary code signals.

Binary code signals such as are utilized in PCM systems or telegraph systems are usually transmitted by multiphase modulation systems. Furthermore, a multiphase modulation system may be utilized for multiplexing. A frequency division system and a time division system are, of course, also utilized for multiplexing. A disadvantage of a multiphase modulation system, however, is that such system requires a carrier wave which is synchronous in phase with the received intelligence wave in order to achieve suitable demodulation. This necessitates complicated, complex and therefore expensive and unreliable equipment.

Although a frequency division multiplex-frequency modulation or FDM-FM transmission system may be utilized as a radio system for transmission via a multiplex telephony channel, such a transmission system requires considerably rigid and specific standards as far as the transmission characteristic and the noise characteristics are concerned. The equipment utilized must therefore provide very precise performance and is thus extremely expensive.

The principal object of the present invention is to provide a new and improved transmission system for transmitting binary code signals. The object of the present invention is to provide a PCM transmission system for transmitting binary code signals. The PCM transmission system of the present invention provides multiplex telephony time division transmission instead of an FDM-FM transmission system and thereby avoids the disadvantages of an FDM-FM system. The PCM transmission system of the present invention thus operates under considerably less rigid requirements than an FDM-FM system and performs satisfactorily although it comprises a small amount of relatively simple and noncomplex equipment. The PCM transmission system of the present invention is also relatively inexpensive due to the simplicity and noncomplexity of its equipment. The radio equipment included in the PCM transmission system of the present invention is also simple and noncomplex. The PCM transmission system of the present invention transmits binary code signals in an asynchronous multiphase modulation system. The PCM transmission system of the present invention also transmits binary code signals in a time division multiplex radio telephony system. The PCM transmission system of the present invention does not require a carrier wave which is synchronous in phase with the received wave in order to provide suitable demodulation of the received wave at the receiver. The PCM transmission system of the present invention is a multiphase modulation system which multiplies a plurality of channels and which transmits binary code signals via radio frequencies. The PCM transmission system of the present invention transmits binary code signals in a multiphase modulation system while minimizing the frequency bandwidth required for transmission.

In accordance with the present invention, the transmitter of a PCM transmission system for transmitting binary code signals comprises a pulse source of binary code signals for providing binary pulses. A wave shaper has an output and an input connected to the pulse source for shaping the binary pulses into a rectangular wave pulse train having spaced positive pulses each having a pulse duration equal to the period from the leading edge of a corresponding one of the binary pulses coincident with the leading edge of the corresponding positive pulse of the leading edge of the next succeeding one of the binary pulses. A carrier source provides a carrier wave. A phase modulator has an output, an input connected to the output of the wave shaper and an input connected to the carrier source for phase modulating the carrier wave with the rectangular wave pulse train to provide a phase shifted carrier at its output. Transmitting means connected to the output of the phase modulator transmits the phase shifted carrier via wireless. The transmitting means includes a band-pass filter connected to the output of the phase modulator for filtering the phase shifted carrier, an antenna and a frequency step-up stage connected between the band-pass filter and the antenna for increasing the frequency of the phase shifted carrier.

The receiver comprises receiving means for receiving the transmitted phase shifted carrier. A phase discriminator has an output and an input connected to the receiving means for demodulating the received phase shifted carrier to the binary pulses provided by the pulse source of the transmitter and an output connected to the output of the phase discriminator for deriving the binary pulses from the receiver. The receiving means comprises an antenna and a frequency stepdown stage connected between the antenna and the input of the phase discriminator for decreasing the frequency of the phase shifted carrier.

In another embodiment of the present invention, the wave shaper comprises a first wave shaper having an output and an input for shaping positive binary pulses into a first rectangular wave pulse train having spaced positive pulses each having a pulse duration equal to the period from the leading edge of a corresponding one of the positive binary pulses coincident with the leading edge of the corresponding positive pulse to the leading edge of the next succeeding one of the positive binary pulses and a second wave shaper having an output and an input for shaping negative binary pulses into a second rectangular wave pulse train having spaced positive pulses each having a pulse duration equal to the period from the leading edge of a corresponding one of the negative binary pulses coincident with the leading edge of the corresponding negative pulse to the leading edge of the next succeeding one of the negative binary pulses. A positive pulse deriving stage is connected between the pulse source and the input of the first wave shaper for supplying positive binary pulses to the first wave shaper. A negative pulse deriving stage is connected between the pulse source of the input of the second wave shaper for supplying negative binary pulses to the second wave shaper. The phase modulator comprises a first phase modulator having an output, an input connected to the output of the first wave shaper and an input connected to a first carrier source for phase modulating a first carrier wave with the first rectangular wave pulse train to provide a first phase shifted carrier at its output and a second phase modulator having an output, an input connected to the output of the second wave shaper and an input connected to a second carrier source for phase modulating a second carrier wave with the second rectangular wave pulse train to provide a second phase shifted carrier at its output. A combining stage has an input connected to the output of the first phase modulator, an input connected to the output of the second phase modulator and an output connected to the transmitting means for combining the first and second phase shifted carriers to provide a resultant phase shifted carrier to the transmitting means for transmission via wireless.

In order that the present invention may be readily carried into effect, it will now be described with reference to the accompanying drawings, wherein.

Figure 1:
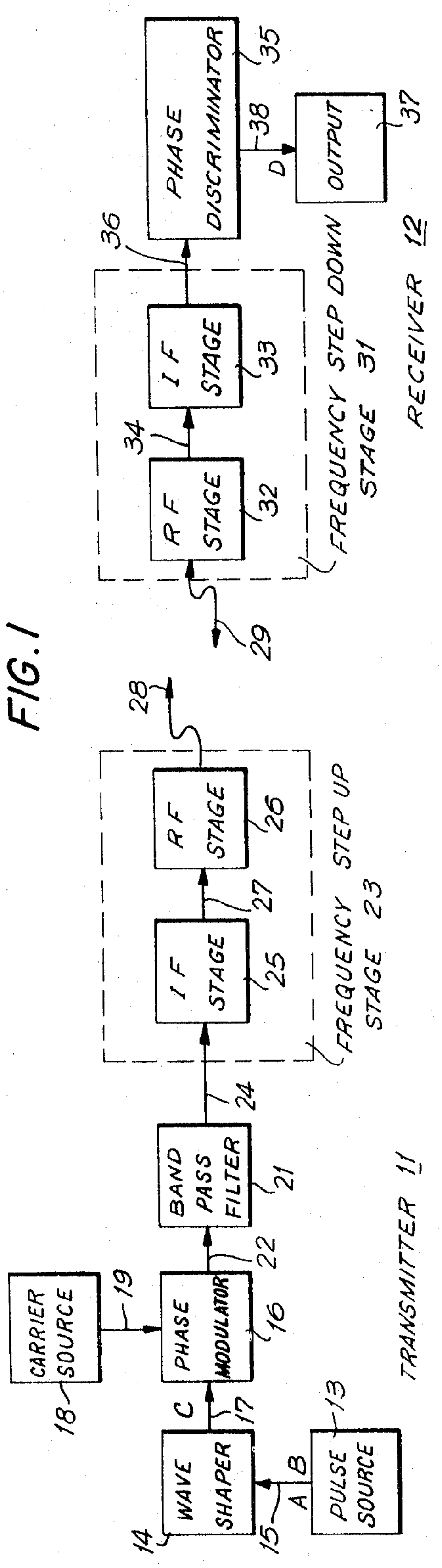
FIG. 1 is a schematic block diagram of an embodiment of the system of the present invention for transmitting binary code signals.

In FIG. 1, the system of the present invention for transmitting binary code signals comprises a transmitter 11 and a receiver 12. The transmitter 11 transmits pulse code signals at radio frequencies to the receiver 12 via radio or wireless.

The transmitter 11 comprises a pulse source 13 which provides binary code signals representing intelligence to be transmitted. The binary code signals are in the form of pulse trains and comprise PCM signals. The pulse source 13 may comprise any suitable source of pulses as aforedescribed such as, for example, a storage or memory unit or the like. The binary code signal or pulse train provided by the pulse source 13 may comprise either the monopolar pulse train as shown in curve A of FIG. 2 or a bipolar pulse train as shown in curve B of FIG. 2.

Figure 2:
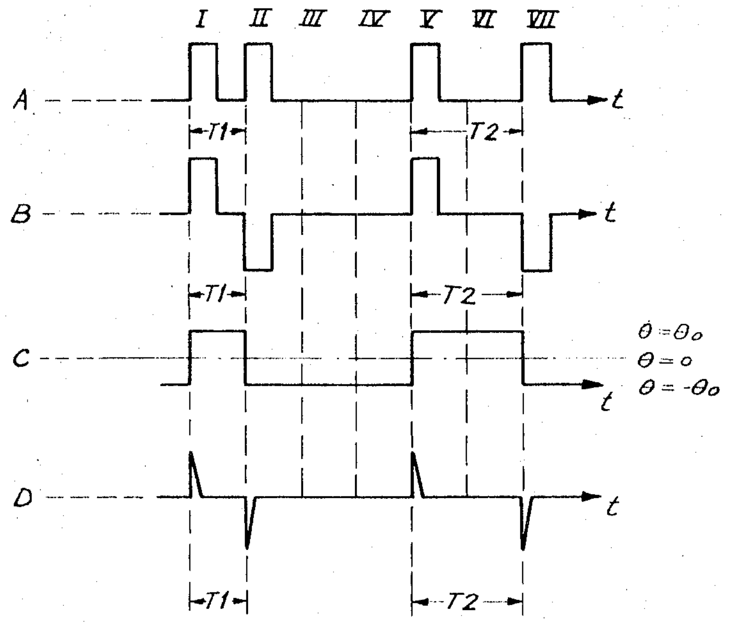
FIG. 2 is a graphical illustration of various waveforms appearing at various points of the system of FIG. 1.

In each of the curves A and B of FIG. 2, the pulse train comprises a specific number of bits such as, for example, 7 bits. Thus, 7 bits of the binary signal comprise a channel and 24 channels comprise a frame. The bit positions of one channel, as illustrated in the curves A and B of FIG. 2, are indicated as I, II, III, IV, V, VI and VII. In the curves A and B, a bit appears at each of the bit positions I, II, V and VII. Each of the pulses may represent a binary "1" so that the coded information depicted by these curves is 1100101. The principal distinction between the curves A and B is that in curve A each of the bits at the bit positions I, II, V and VII is a positive pulse, whereas in curve B, the bits it the bit positions I and V are positive pulses and the bits at the bit positions II and VII are negative pulses. The pulse source 13 supplies the pulses representing data or intelligence to the input of a wave shaper 14 via a lead 15. The wave shaper 14 functions to shape the curve A or the curve B, whichever is fed thereto, to a square or rectangular wave having a duration time which is determined by the leading edges of adjacent ones of the pulses of the curves A and B. The curve C of FIG. 2 illustrates the output square or rectangular wave produced by the wave shaper 14. The duration T1 of the first positive square wave pulse of curve C of FIG. 2 is equal to the period from the leading edge of the positive bit pulse in the bit position I to the leading edge of the next succeeding positive or negative bit pulse in the bit position II. The duration T2 of the second positive square wave pulse of the curve C of FIG. 2 is equal to the period from the leading edge of the positive bit pulse in the bit position V to the leading edge of the next succeeding positive or negative bit pulse in the bit position VII.

The wave shaper 14 may comprise any suitable known wave shaping circuit. A suitable wave shaping circuit may comprise for example, a bistable multivibrator or flip-flop. The square or rectangular wave output of the wave shaper 14 is supplied to an input of a phase modulator 16 via a lead 17.

A carrier source 18 supplies a carrier wave of suitable carrier frequency to the phase modulator 16 via a lead 19. The phase modulator 16 functions to phase modulate the relatively low carrier frequency of the carrier wave supplied by the carrier source 18 with the square wave pulse train supplied by the wave shaper 14. The phase modulator 16 supplies the phase modulated or phase shifted carrier to a band-pass filter 21 via a lead 22. The phase modulated carrier wave is a phase shifted wave having a phase characteristic which is the same as that of the curve C, but with an instantaneous frequency variation.

The carrier source 18 may comprise any known suitable source of a carrier wave such as, for example, a suitable oscillator or signal generator. The phase modulator 16 may comprise any known suitable phase modulating circuit for phase modulating the carrier wave supplied to it by the pulse train supplied to it by the wave shaper 14. The band-pass filter 21 may comprise any known suitable band-pass filter arrangement. The band-pass filter preferably has a bandwidth of $\pm 2\omega 1$, where $\omega 1 = 2\pi/2T$ and $T$ is the period of the binary pulses.

The phase shifted carrier provided by the phase modulator 16 is filtered by the band-pass filter 21 and is supplied to a frequency step-up stage 23 via lead 24. The frequency step-up stage 23 functions to step up or increase the frequency of the phase shifted pulse train to a frequency high enough for radio or wireless transmission. The frequency step-up stage 23 may thus comprise any suitable combination of components for stepping up the frequency to a radio frequency such as, for example, an intermediate frequency stage 25 having an input connected to the lead 24 and an output connected to a radio frequency stage 26 via a lead 27. The output of the radio frequency stage 26 is connected to a transmitter antenna 28 which transmits the phase shifted radio frequency pulse train. The frequency step-up stage 23 may comprise any known components necessary for its proper operation such as, for example, a local oscillator, which functions as a source of local frequency signals and which is not shown in FIG. 1.

The receiver 12 comprises a receiver antenna 29 which is connected to the input of a frequency stepdown stage 31. The phase shifted pulse train transmitted from the transmitter 11 via the antenna 28 is received by the antenna 29 and is supplied to the frequency stepdown stage 31. The frequency stepdown stage 31 functions to step down or decrease the frequency of the received phase shifted pulse train to an intermediate or, if desired, audio frequency. The frequency stepdown stage 31 may thus comprise any suitable combination of components for stepping down the frequency from the radio frequency to intermediate frequency such is, for example, a radio frequency stage 32 and an intermediate frequency stage 33. The radio frequency stage 32 is connected between the antenna 29 and the intermediate frequency stage 33 via a lead 34. The frequency stepdown stage 31 may comprise any known components necessary for its proper operation such as, for example, a local oscillator, which functions as a source of local frequency signals and is not shown in FIG. 1.

A phase discriminator 35 has an input connected to the intermediate frequency stage 33 of the frequency stepdown stage 31 via a lead 36. The output of the phase discriminator 35 is connected to an output 37 via a lead 38. The phase discriminator 35 functions to demodulate the phase modulated or phase shifted signal received and supplied to it via the frequency stepdown stage 31. In demodulating the received phase shifted carrier, the phase discriminator 35 provides the binary pulses which were initially provided by the pulse source 13 of the transmitter 11 and supplies such binary pulses to the output 37 whence said binary pulses may be derived from the receiver.

The phase discriminator 35 may comprise in analog phase discriminator for detecting the phase modulation imposed upon the carrier wave by the square wave pulse train initially supplied by the wave shaper 14 of the transmitter 11. The output 37 may comprise any known suitable output arrangement for deriving the modulating wave from the output of the phase discriminator 35. The analog phase discriminator is described with reference to FIGS. 10, 11, 12, 13, 14 and 15.

The modulating wave detected by the phase discriminator 35 is shown in curve D of FIG. 2. The detected modulating wave, as shown in the curve D, comprises a plurality of sharp pulses each having a leading edge which is substantially at an infinite slope and which is coincident with the leading edge and the trailing edge of each pulse of the square wave pulse train shown in the curve C of FIG. 2. A sharp positive pulse thus appears at the leading edge of each square wave pulse of the curve C and a sharp negative pulse appears at the trailing edge of each square wave pulse of the curve C. The pulse train of the curve D is thus seen to be an essential reproduction of the pulse train of the curve B and therefore indicates the accuracy and efficiency of the transmission system of the present invention.

A suitable phase discriminator 35 may comprise, for example, an FM demodulator. This is due to the fact that the phase of the phase shifted carrier wave varies as shown by the curve C of FIG. 2 and the instantaneous frequency variations are defined as $$\Delta f = fo\Delta\theta$$

wherein $\Delta f$ is the instantaneous variation of frequency, $fo$ is the central of intermediate frequency of the phase shifted carrier wave and $\Delta\theta$ is the displacement in phase of the phase shifted wave.

Figure 3:
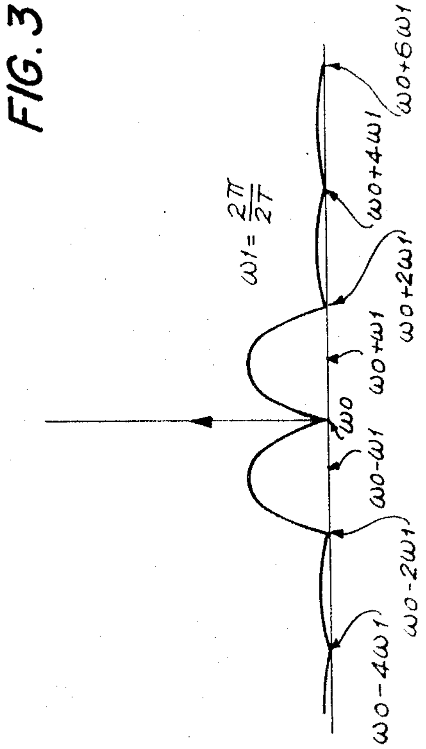
FIG. 3 is a graphical illustration of the frequency spectrum of the transmission wave of the system of FIG. 1.

FIG. 3 shows the frequency spectrum of the transmitted wave which is transmitted from the antenna 28 of the transmitter 11 to the antenna 29 of the receiver 12. The curve of FIG. 3 is the result of an actual calculation of the energy distribution of the sideband included in the phase shifted carrier wave. As seen in FIG. 3, the energy distribution extends infinitely, but most of the energy is within the range of $\omega o \pm 2\omega 1$ so that no problems in transmission arise if this transmitted range is maintained. In the expression of the range as being equal to $\omega o \pm 2\omega 1, \omega o$ corresponds to the angular frequency of the central frequency $fo$ of the phase shifted wave, $\omega 1 = 2\pi/2$ $\pi/2$and $T$ is the period of the PCM binary signal shown in the curve $T$ of FIG. 2. Thus, for example, if transmission is c via made 24channels, $2\omega 1 \doteq 1.5$ megacycles per second, so that the bandwidth required for transmission is $\pm 1.5$ megacycles per second or 3.0 megacycles per second.

Figure 4:
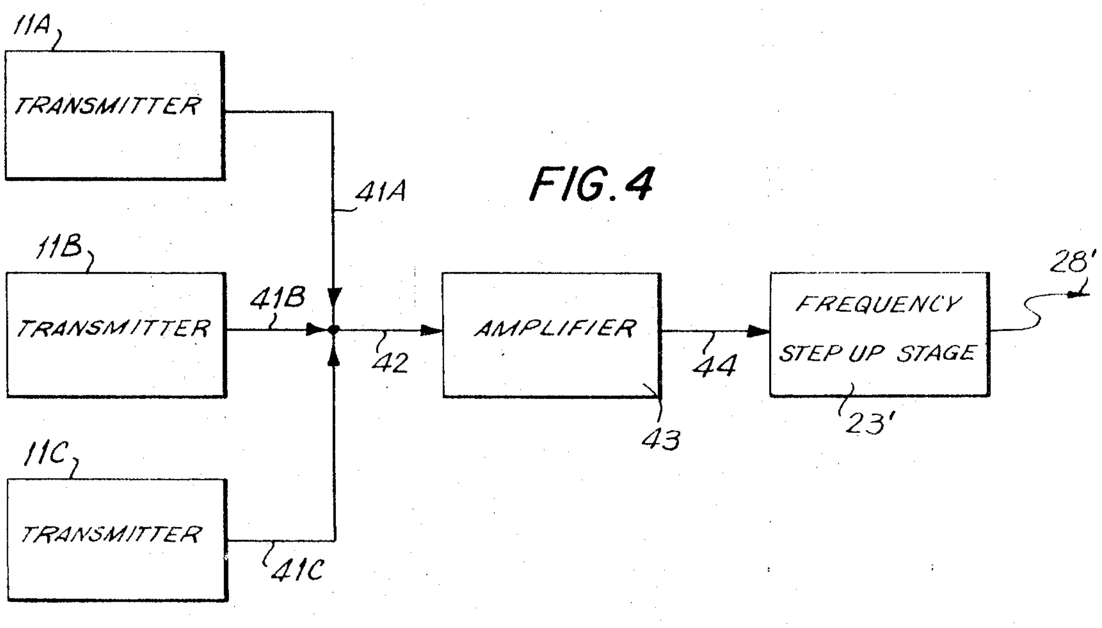
FIG. 4 is a schematic block diagram of a modification of the system of FIG. 1.

When signals are transmitted via a PCM transmission system, the transmission requirements are considerably less rigid than in the case of FDM-FM transmission systems. In the modification of FIG. 4, a plurality of PCM signals are transmitted via a plurality of channels such as, for example, 24 channels. In the modification of FIG. 4, a plurality of transmitters 11A, 11B, 11C, and so on, are connected in common via leads 41A, 41B, 41C, and so on, and lead 42 to the input of a common amplifier 43. The output of the amplifier 43 is connected to the input of a common frequency step-up stage 23′ via a lead 44. A common antenna 28′ is connected to the output of the frequency step-up stage 23′.

Each of the transmitters 11A, 11B, 11C, and so on, is the same in structure as the others, although each of said transmitters represents a different PCM signal. In a 24-channel system, there may be 24 transmitters. Each of the transmitters 11A, and so on, comprises the components of the transmitter 11 of FIG. 1, with the exception of the frequency step-up stage 23 of FIG. 1 and the antenna 28 of FIG. 1. Thus, each transmitter of FIG. 4 comprises a pulse source which provides binary code pulses and which supplies such pulses to a wave shaper, which shapes the binary pulses in the aforedescribed manner and supplies them to a phase modulator, which modulates a carrier wave in the aforedescribed manner and which supplies said carrier wave to a band-pass filter which filters the phase modulated carrier wave in the aforedescribed manner. In FIG. 4, the filtered phase modulated or phase shifted signal is supplied to the common amplifier 43 via the common lead 42.

The amplified phase modulated or phase shifted signals are transmitted via the common frequency step-up stage 23′ which is the same as the frequency step-up stage 23 of the transmitter 11 of FIG. 1. In each of the transmitters 11A, 11B, and so on, of FIG. 4, the band-pass filter has a bandwidth of $\pm 2\omega 1$ as does the band-pass filter 21 of FIG. 1. The amplified phase shifted signals are thus multiplied in frequency and are transmitted in a single radio frequency bandwidth of approximately 20 megacycles per second.

The amplifier 43 of FIG. 4 may comprise any known suitable amplifier for amplifying the various phase shifted signals provided by the various transmitters 11A, and so on. Due to the relatively nonrigid transmission requirements of the PCM transmission system of FIG. 4, said PCM transmission system is of low cost in manufacture and in operation relative to a standard radio transmission system, and is at the same time efficient, effective, and reliable.

Figure 5:
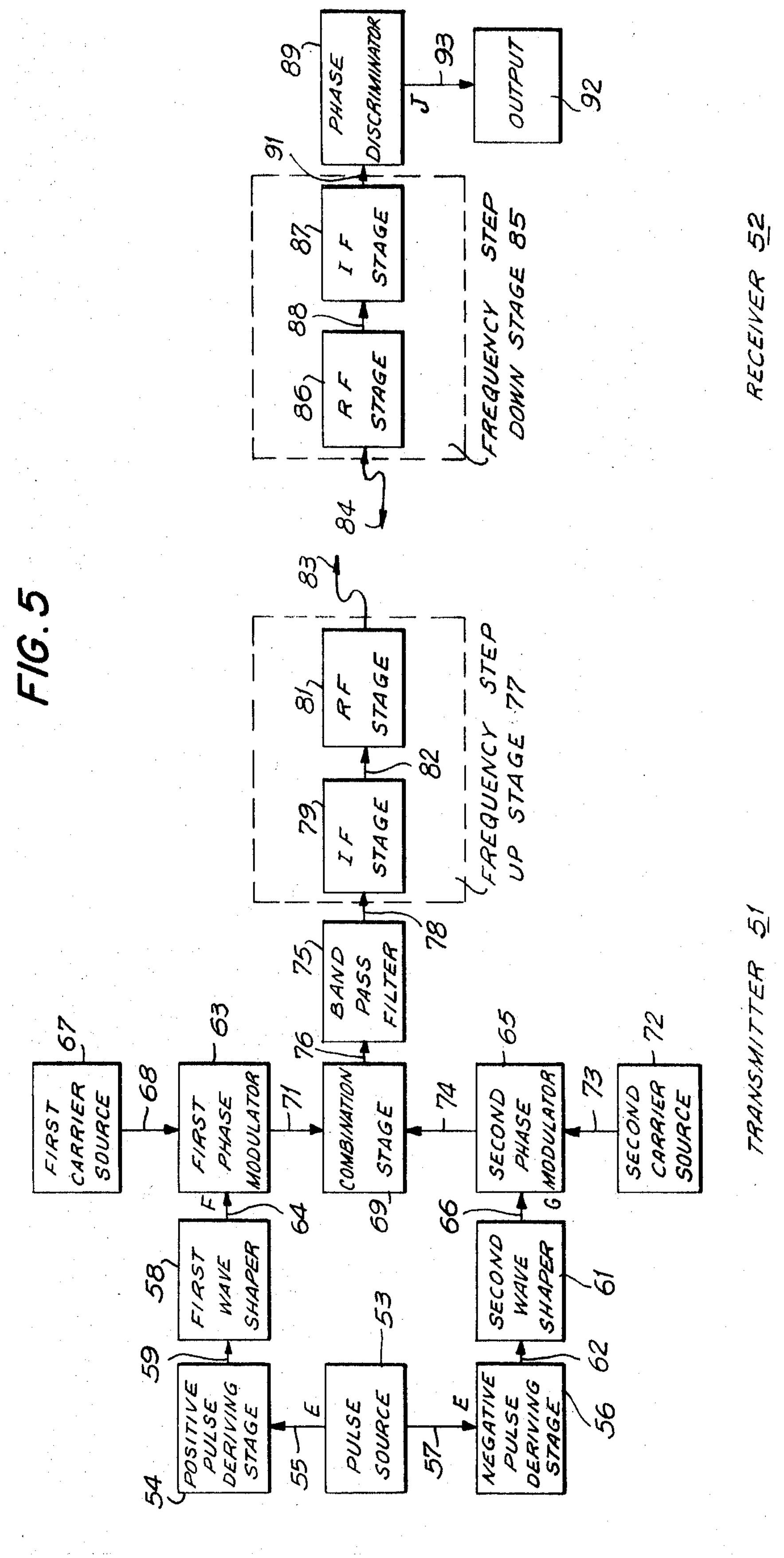
FIG. 5 is a schematic block diagram of another embodiment of the system of the present invention for transmitting binary code signals.

FIG. 5 is another embodiment of the PCM transmission system of the present invention for transmitting binary code signals. In FIG. 5, the system of the present invention for transmitting binary code signals comprises a transmitter 51 and a receiver 52. The transmitter transmits pulse code signals at radio frequencies to the receiver 52 via radio or wireless. The transmitter 51 comprises a pulse source 53 which provides binary code signals representing intelligence to be transmitted. The binary code signals are in the form of pulse trains and are the same as those produced by the pulse source 13 of FIG. 1, as shown in curve B of FIG. 2. The pulse source 53 may be identical with the pulse source 13 of FIG. 1. The binary code signal or pulse train provided by the pulse source 53 comprises a bipolar pulse train as shown in the curve E of FIG. 6.

Figure 6:
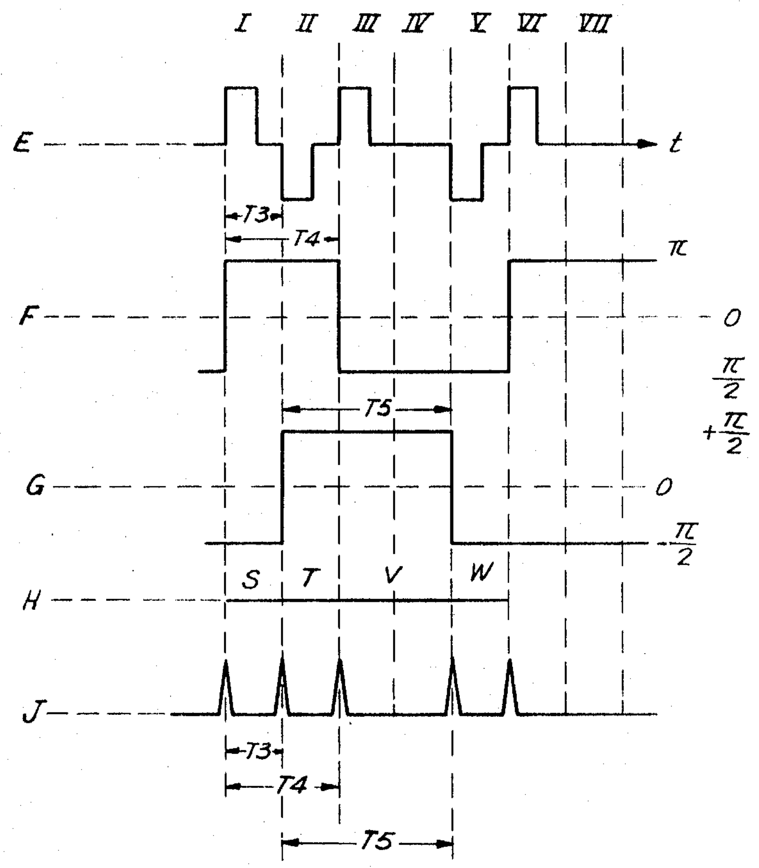
FIG. 6 is a graphical illustration of various waveforms appearing at various points of the system of FIG. 5.

In the curve E of FIG. 6, the pulse train comprises a specific number of bits, as does the pulse train of the curve B of FIG. 2. Thus, 7 bits of the binary signal comprise a channel and 24channels comprise a frame. The bit positions of one channel as illustrated in the curve E, are indicated as I, II, III, IV, V, VI and VII. In the curve E, a bit appears at each of the bit positions I, II, III, V and VI The coded information depicted by this curve is thus 1110110. In the curve E, each of the bits at the bit positions I, III and VI is a positive pulse, whereas each of the bits at the bit positions II and V is a negative pulse.

The pulse source 53 supplies the pulses representing data or intelligence to the input of a positive pulse deriving stage 54 via a lead 55 and to the input of a negative pulse deriving stage 56 via a lead 57. The positive pulse deriving stage derives the positive pulses from the pulse train supplied to it by the pulse source 53, in this case, the pulses in the bit positions I, III and VI, and supplies such positive pulses to a first wave shaper 58 via a lead 59. The negative pulse deriving stage 56 derives the negative pulses from the pulse train supplied to it by the pulse source 53, in this case, the pulses in the bit positions II and V, and supplies such negative pulses to a second wave shaper 61 via a lead 62.

The first wave shaper 58 functions to shape the positive pulses of the curve E of FIG. 6 to a square or rectangular wave having a duration time which is determined by the leading edges of adjacent ones of the positive pulses of said curve. The curve F of FIG. 6 illustrates the output square or rectangular wave produced by the first wave shaper 58. The duration T3 of the first positive square wave pulse of curve E is equal to the period from the leading edge of the positive bit pulse in the bit position I to the leading edge of the next succeeding negative bit pulse in the bit position II. The duration T4, however, of the first cycle or combination of positive and negative pulses of the curve E of FIG. 6 is equal to the period from the leading edge of the positive bit pulse in the bit position I to the leading edge of the next succeeding positive bit pulse in the bit position III. The duration T4 of the first positive square wave pulse of the curve F of FIG. 6 is equal to the cyclic period of the curve E.

The second wave shaper 61 functions to shape the negative pulses of the curve E to a square or rectangular wave having a duration time which is determined by the leading edges of adjacent ones of the negative pulses of said curve. The curve G of FIG. 6 illustrates the output square or rectangular wave produced by the second wave shaper 61. The duration T5 of the first negative square wave pulse and the second positive square wave pulse of the curve E is equal to the period from he leading edge of the first negative bit pulse in the bit position II to the leading edge of the next succeeding negative bit pulse in the bit position V. The duration T5 of the first positive square wave pulse of the curve G of FIG. 6 is equal to the corresponding duration T5 of the curve E.

Each of the first and second wave shapers 58 and 61 may comprise any suitable known wave shaping circuit. A suitable wave shaping circuit may comprise, for example, a bistable multivibrator or flip-flop. The square or rectangular wave output, shown in curve F of FIG. 6, of the first wave shaper 58 is supplied to an input of the first phase modulator 63 via a lead 64. The square or rectangular wave output shown in curve G of FIG. 6, is supplied to an input of a second phase modulator 65 via a lead 66.

A first carrier source 67 supplied a first carrier wave of suitable carrier frequency to the first phase modulator 63 via a lead 68. The first phase modulator 63 functions to phase modulate the relatively low carrier frequency of the first carrier wave supplied by the first carrier source 67 with the square wave pulse train supplied by the first wave shaper 58. The first phase modulator 63 supplies the first phase modulated or phase shifted carrier wave to a combination stage 69 via a lead 71.

A second carrier source 72 supplies a second carrier wave of suitable carrier frequency to the second phase modulator 65 via a lead 73. The phase of the first carrier wave and the phase of the second carrier wave are different from each other by 90°. The second phase modulator 65 functions to modulate the relatively low carrier frequency of the second carrier wave supplied by the second carrier source 73 with the square wave pulse train supplied by the second wave shaper 61. The second phase modulator 65 supplies the second phase modulated or phase shifted carrier wave to the combination stage 69 via a lead 74.

Each of the first and second carrier sources 67 and 72 may comprise any known suitable source of a carrier wave such as, for example, a suitable oscillator or signal generator. Each of the first and second phase modulators 63 and 65 may comprise any known suitable phase modulating circuit for phase modulating the carrier wave supplied to it by the pulse train supplied to it by the corresponding wave shaper. The combination stage 69 comprises any known suitable circuitry for combining the first phase shifted carrier wave provided by the first phase modulator 63 and the second phase shifted carrier wave provided by the second phase modulator 65 to provide a resultant phase shifted carrier wave.

The combination stage 69 supplies the resultant phase shifted carrier to a band-pass filter 75 via a lead 76. The band-pass filter 75 may be the same as the band-pass filter 21 of FIG. 1 and preferably has a bandwidth of $\pm 2\omega 1$, where $\omega 1 = 2\pi/2T$ and T is the period of the binary pulses. The resultant phase shifted carrier provided by the combination stage 69 is filtered by the band-pass filter 75 and is supplied to a frequency step up stage 77 via lead 78.

The frequency step up stage 77 is the same as the frequency step up stage 23 of FIG. 1 and functions in the same manner. The frequency step up stage 77 may thus comprise an IF stage 79 connected to the output of the band-pass filter 75 and RF stage connected to the output of the IF stage 79 via a lead 82. A transmitting antenna 83 is connected to the output of the RF stage 81.

The receiver 52 of the embodiment of FIG. 5 is the same as the receiver 12 of the embodiment of FIG. 1 and operates in the same manner. The receiver 52 therefore comprises a receiving antenna 84 connected to the input of a frequency step down stage 85 comprising an RF stage 86 and an IF stage 87; the antenna 84 being connected to the input of the IF stage 87 via a lead 88. The IF stage 87 is connected to the input of a phase discriminator 89 via a lead 91 and the output of the phase discriminator is connected to an output 92 via a lead 93.

The phase discriminator 89 functions in the same manner as the phase discriminator 35 of FIG. 1 to demodulate the phase modulated or phase shifted signal received and supplied to it via the frequency step down stage 85. In demodulating the received phase shifted carrier, the phase discriminator 89 provides the binary pulses which were initially provided by the pulse source 53 of the transmitter 51 and supplies such binary pulses to the output 92 whence said binary pulses may be derived from the receiver.

The modulating wave detected by the phase discriminator 89 is shown in curve J of FIG. 6. The detected modulating wave, as shown in the curve J, comprises a plurality of sharp pulses each having a leading edge which is substantially at an infinite slope and which is coincident with the leading edge and the trailing edge of each pulse of each of the square wave pulse trains shown in the curves F and G of FIG. 6. A sharp positive pulse thus appears at the leading edge of each square wave pulse of the curve F and a sharp positive pulse also appears at the trailing edge of each square wave pulse of the curve F. A sharp positive pulse appears at the leading edge of each square wave pulse of the curve G and a sharp positive pulse also appears at the trailing edge of each square wave pulse of the curve G. The pulse train of the curve J is thus seen to be an essential reproduction of the pulse train of the curve E and therefore indicates the accuracy and efficiency of the transmission system of the present invention.

Figure 7:
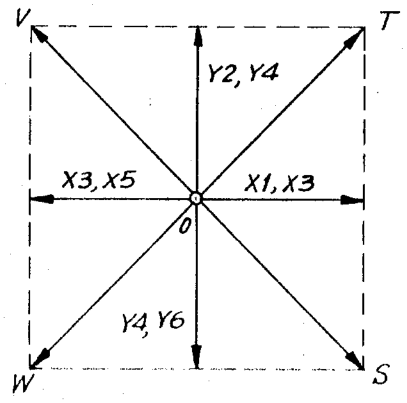
FIG. 7 is a vector diagram of various waves of FIG. 6.

In the embodiment of FIG. 5, the depth of modulation is $\pm\pi/2$ radian in both modulated carrier waves. The first and second phase modulated carrier waves may be represented, as shown in FIG. 7, by vectors X1, X3; Y2, Y4; X3, X5; Y4, Y6, which differ in phase by $\pi/2$. Since parts of these vectors overlap each other in time, if the two phase modulated carrier waves are composed, vectors are provided which rotate in accordance with time. The vectors OS, OT, OV and OW of FIG. 7 are thus provided and rotate in accordance with time in dependence upon the manner of overlapping of their component vectors. When the initial binary signals of the PCM transmission system, as provided by the pulse source 53, are as shown in curve E of FIG. 6, the relation of overlapping in time regarding the vectors OS, OT, OV and OW is shown in curve H of FIG. 6. The PCM pulse train is thus converted into a pattern of multiphase modulated waves having a phase difference of 90° relative to each other. In the embodiment of FIG. 5, the PCM pulse train is converted into a pattern of four phase modulated waves.

When the multiphase modulated waves, four phase modulated waves in the embodiment of FIG. 5, are transmitted via wireless or radio, the initial PCM signals may be demodulated or derived from the modulated carrier wave at the receiver by a usual type of frequency discriminator. Since a frequency discriminator provides an output which is proportional to the rate of change of the phase, the pulse train shown in curve J of FIG. 6 is provided by the phase discriminator 89. The phase discriminator 89 may thus comprise a known monostable multivibrator and functions to accurately reproduce the initial PCM signals shown in the curve E of FIG. 6.

Since the signals represented by the vectors OS, OT, OV and OW of FIG. 7 have an infinitely expanding sideband, there is little or no difficulty involved in transmitting them. This is especially so where they are transmitted via radio or wireless, where it is usually absolutely necessary to save the frequency band. Although the composed signals which have not been further modified in phase, as shown in FIG. 7, hive infinite frequency components as mentioned, most of the energy is concentrated within a specific frequency bandwidth. Thus, from a practical point of view, information or intelligence contained in the initial time position may be transmitted completely by transmitting only a specific frequency range. The transmission band is the carrier frequency $\pm 1/2T$ cycles per second. Where PCM signals are transmitted via 24 channels, for example, the transmission band is approximately the carrier frequency of ±750 kilocycles per second.

Figure 8:
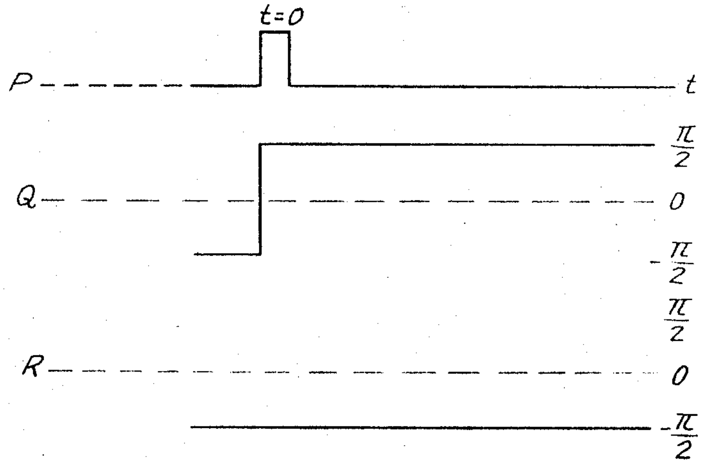
FIG. 8 is a graphical presentation of the vectors of FIG. 7.
Figure 9:
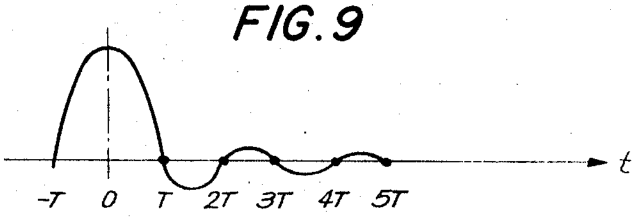
FIG. 9 is a graphical presentation of the transmission wave provided when the waveforms of FIG. 6 occur in the system of FIG. 5.

The approximation of the transmission band to the carrier frequency may be determined in accordance with FIGS. 8 and 9. The initial PCM or binary signal is assumed to be that shown as curve P of FIG. 8. Curve Q of FIG. 8 corresponds to the first wave shaped pulse train shown in curve F of FIG. 6. Curve R of FIG. 8 corresponds to the second wave shaped pulse train shown in curve G of FIG. 6.

The second carrier wave, which is phase modulated by the curve R of FIG. 8, corresponding to the curve G of FIG. 6, may be expressed as *cosωot* and the first carrier wave which is phase modulated by the curve Q of FIG. 8, corresponding to the curve F of FIG. 6, may be expressed as $$f(t)\cdot \sin \omega o t$$

wherein $f(t)$ may be expressed by the following equation, taking into consideration the fact that the composite phase modulated carrier wave passes through the band-pass filter 75, which band-pass filter has a cutoff angle frequency at $\omega o \pm \omega a$.

$$f(t)=\frac{1}{2\pi}\int_{-\omega a}^{\omega a} \epsilon^{-j\omega t}\left[\int_{0}^{\alpha} \epsilon^{j\omega\tau}d\tau-\int_{-\alpha}^{0} \epsilon^{j\omega\tau}d\tau\right]d\omega$$

Thus, $$f(t)=\frac{2}{\pi}\sin \omega at \text{ and } \sin \theta=\int_{0}^{\theta}\frac{\sin x}{x}\,dx$$

is derived. Thus, the phase angle of the composite wave of $f(t)$ *sinωot* and *cosωot* may be expressed as $$\phi=\omega ot+\tan^{-1}\left(\frac{2}{\pi}\sin \omega at\right)$$

The instantaneous frequency may thus be expressed as $$\frac{d\phi}{dt}=\omega o+\frac{\frac{2}{\pi}\omega a\frac{\sin \omega at}{\omega at}}{1+\left(\frac{2}{\pi}\sin \omega at\right)^{2}}$$

An output signal proportional to the second term on the right-hand side of the equal sign of the foregoing equation is provided by the phase or frequency discriminator 89 at its output and is supplied to the output 92 via the lead 93.

If thus $\omega a=2\pi/2T$, which is the bandwidth as aforedescribed, the foregoing equation has the following values. When $t=nT$, and $n$ does not equal zero, the value is always zero. When $t$ equals zero, the value is $2\omega a/\pi$.

The waveform of the signal transmitted by the transmitter 51 is thus shown in FIG. 9. As illustrated in FIG. 9, the amplitude of the waveform is always zero at the times when other pulses may exist, that is, when $t=nT$. Therefore, the amplitudes of the other pulses are not affected. The information may thus be transmitted correctly via a band of $\pm\omega a=\pm 2\pi/2T$.

In accordance with the invention, the phase shifted carrier is demodulated by a phase discriminator in the receiver. In the phase discriminator of the invention, when the phase of the input wave is changed, the provided detected output voltage is changed linearly and the phase discriminator operates in an analog manner. Analog phase discriminators are well known, and include the Foster-Seeley type, the Round-Travis type, the Weiss type and the ratio detector type, and modifications thereof.

Figure 10:
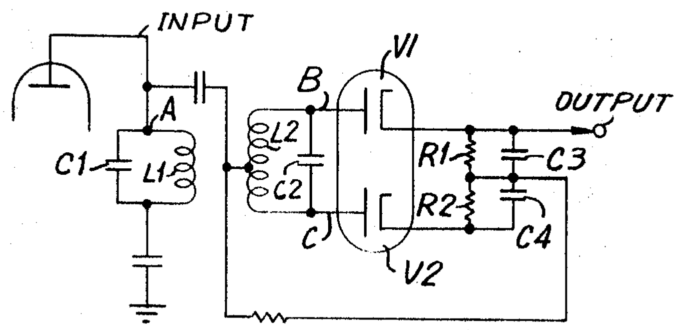
FIG. 10 is a circuit diagram of a Foster-Seeley type phase discriminator.

A Foster-Seeley type phase discriminator is described on pages 516 and 517 of Volume 5 of the McGraw-Hill Encyclopedia of Science and Technology, 1960, McGraw-Hill Book Company, Inc., USA. A Foster-Seeley type phase discriminator is illustrated in FIG. 10. In FIG. 10, resonant circuits L1, C1 and L2, C2 are tuned to the central frequency of the input. The phase difference between the high frequency voltage vector of L1, C1 of the primary side and the high frequency voltage vector of L2, C2 of the secondary side is 90°.

Figure 11:
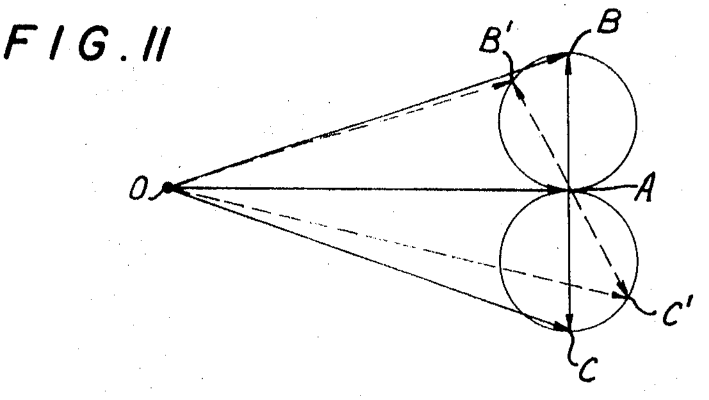
FIG. 11 is a graphical presentation illustrating the relation between the voltages in the Foster-Seeley phase discriminator of FIG. 10.

FIG. 11 is a graphical presentation illustrating the relation between the voltages in the Foster-Seeley phase discriminator of FIG. 10. In FIG. 11, the vector OA represents the voltage of the primary side and the vector BC represents the voltage of the secondary side. The voltages OB and OC are applied to the anodes of the diodes V1 and V2 and the outputs are applied in opposite polarity directions by resistors R1 and R2. Therefore, when the input is at the central frequency, voltages proportional to the solid lines OB and OC of FIG. 11 appear at the two ends of the resistors R1 and R2 of FIG. 10 and the output voltage becomes zero.

If the phase of the input is changed, the phases of the primary side and the secondary side become those indicated by the broken lines of FIG. 11. The output voltage then appears as the difference between the voltage vectors OB′ and OC′. The Output voltage may be changed linearly in relation to the change of the phase of the input.

Figure 12:
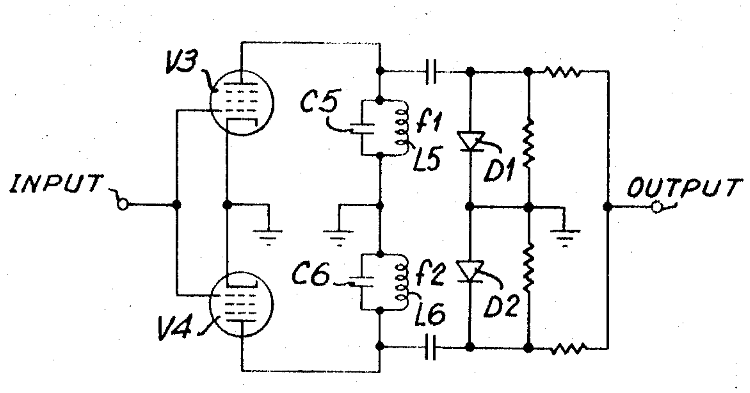
FIG. 12 is a circuit diagram of an embodiment of a Round-Travis phase discriminator.
Figure 13:
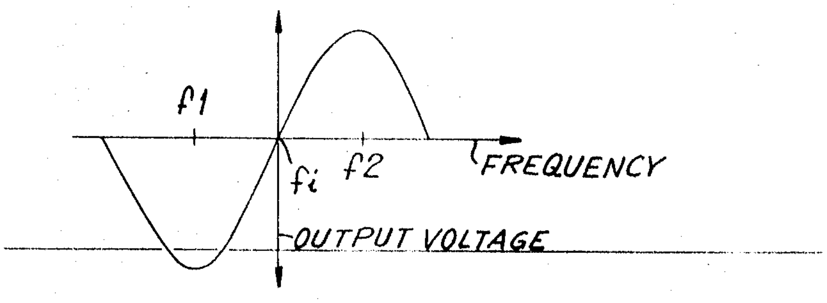
FIG. 13 is a graphical presentation of an output voltage which may be derived from the Round-Travis phase discriminator of FIG. 12.

A Round-Travis phase discriminator is disclosed in an article beginning on page 8 of Wireless World of Jan. 1957, entitled "Limiters and Discriminators for F.M. Receivers" by G. G. Johnstone. A Round-Travis phase discriminator is shown in FIG. 12. In FIG. 12, a resonant circuit L5, C5 is turned to a frequency *f1* and is connected in the output circuit of a vacuum tube V3. A resonant circuit L6, C6 is tuned to a frequency *f2* and is connected in the output circuit of a vacuum tube V4.

The frequencies *f1* and *fw* are equally removed from the central frequency *f1*. The frequency *f1* is greater than the central frequency *f1* and the frequency *f2* is less than said central frequency. Therefore, if the voltages of the resonant circuits are rectified by the diodes D1 and D2, and a composite output is derived, the characteristic shown in FIG. 13 may be provided. An output voltage proportional to the input frequency or phase may thus be provided.

A ratio detector is described on pages 517, 518 and 519 of the aforedescribed Volume 5 of the McGraw-Hill Encyclopedia of Science and Technology. The ratio detector is similar to the Foster-Seeley phase discriminator in principle, except that in the ratio detector one of the two diodes is connected with reverse polarity and a pair of capacitors equivalent to the capacitors C3 and C4 of FIG. 10 have a large capacity.

Figure 14:
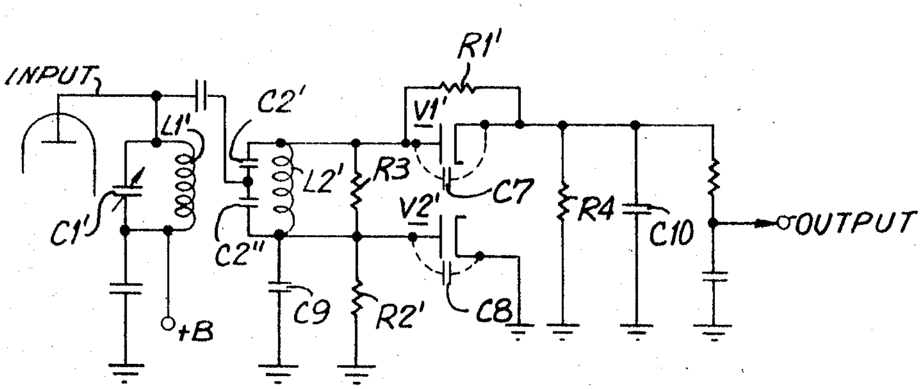
FIG. 14 is a circuit diagram of an embodiment of a Weiss phase discriminator.
Figure 15:
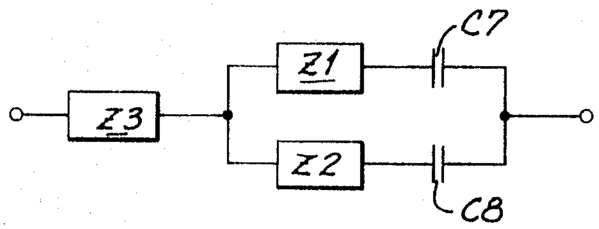
FIG. 15 is an equivalent circuit of the Weiss phase discriminator of FIG. 14.

A Weiss phase discriminator is similar in principle to the Foster-Seeley phase discriminator. In the Weiss discriminator, independent circuits are utilized as the coupling tuning circuits L1, C1 and L2, C2. The two tuning circuits are mutually coupled to a capacitor. The capacitor is utilized to couple the tuning circuits, as shown in FIG. 14. FIG. 15 is an equivalent circuit of FIG. 14, wherein C7 and C8 represent electrostatic capacities and Z1, Z2 and Z3 are expressed as follows:

$$Z1=\frac{\frac{L2'}{C1'}}{j\left[\omega L2'-\frac{1}{\omega C^*}\right]}$$

$$Z2=\frac{\frac{L1'}{C2'}}{j\left[\omega L2'-\frac{1}{\omega C^*}\right]}$$

$$Z3=\frac{\frac{1}{j\omega C1'}-\frac{1}{j\omega C2'}}{j\left[\omega L2'-\frac{1}{\omega C^*}\right]}$$

wherein $$C^*=\frac{C1'C2'}{(C1'+C2')}$$

In the foregoing equations, Z1, C7 tunes at a frequency of *f1* and Z2, C8 tunes at a frequency of *f2*, which is less than the frequency *f1*. The rectified outputs of the circuits tuned to *f1*, *f2* which are the outputs of the vacuum tubes V1′ and V2′, are supplied in series and in the reverse direction, so that the discriminator characteristic may be provided as a Round-Travis type.

While the invention has been described by means of specific examples and in specific embodiments, I do not wish to be limited thereto, for obvious modifications will occur to those skilled in the art without departing from the spirit and scope of the invention.

I claim:

1. In a PCM transmission system for transmitting binary code signals, a transmitter comprising a pulse source of binary code signals for providing binary pulses, wave shaper means having an output and an input connected to said pulse source for shaping said binary pulses into a rectangular wave pulse train having spaced positive pulses each having a pulse duration equal to the period from the leading edge of a corresponding one of said binary pulses coincident with the leading edge of said corresponding positive pulse to the leading edge of the next succeeding one of said binary pulses, said wave shaper means comprising a first wave shaper having an output and an input for shaping positive ternary pulses into a first rectangular wave pulse train having spaced positive pulses each having a pulse duration equal to the period from the leading edge of a corresponding one of said positive ternary pulses coincident with the leading edge of said corresponding positive pulse to the leading edge of the next succeeding one of said positive ternary pulses and a second wave shaper having an output and an input for shaping negative ternary pulses into a second rectangular wave pulse train having spaced positive pulses each having a pulse duration equal to the period from the leading edge of a corresponding one of said negative ternary pulses coincident with the leading edge of said corresponding negative pulse to the leading edge of the next succeeding one of said negative ternary pulses, positive pulse deriving means connected between said pulse source and the input of said first wave shaper for supplying positive ternary pulses to said first wave shaper and negative pulse deriving means connected between said pulse source and the input of said second wave shaper for supplying negative ternary pulses to said second wave shaper, a carrier source of carrier wave, phase modulator means having an output, an input connected to the output of the first wave shaper of said wave shaper means and an input connected to said carrier source for phase modulating said carrier wave with said rectangular wave pulse train to provide a phase shifted carrier at its output, and transmitting means connected to the output of said phase modulator means for transmitting said phase shifted carrier via wireless, said transmitting means including a band-pass filter connected to the output of said phase modulator means for filtering the phase shifted carrier and having a bandwidth of $\pm 2\omega 1$, where ⅝1=$2\pi/2T$ and $T$ is the period of said binary pulses, antenna means and frequency step up means connected between said band-pass filter and said antenna means for increasing the frequency of the phase shifted carrier; and a receiver comprising receiving means for receiving the transmitted phase shifted carrier, analog phase discriminating means having an output and an input connected to said receiving means for demodulating the received phase shifted carrier to the binary pulses provided by the pulse source of said transmitter, said receiving means comprising antenna means and frequency step down means connected between said antenna means and the input of said phase discriminating means for decreasing the frequency of the received phase shifted carrier, and an output connected to the output of said phase discriminating means for deriving said binary pulses from said receiver.

2. In a PCM transmission system as claimed in claim 1, wherein the carrier having of said transmitter comprises a first carrier source for providing first carrier wave and a second carrier source for providing a second carrier wave, said first and second carrier wave differing in phase, and the phase modulator means of said transmitter comprises a first phase modulator having an output, an input connected to the output of said first wave shaper means and an input connected to said first carrier source for phase modulating said first carrier wave with said first rectangular wave pulse train to provide a first phase shifted carrier at its output and a second phase modulator having an output, an input connected to the output of said second wave shaper means and an input connected to said second carrier source for phase modulating said second carrier wave with said second rectangular wave pulse train to provide a second phase shifted carrier at its output and wherein said transmitter further comprises combining means having an input connected to the output of said first phase modulator, an input connected to the output of said second phase modulator and an output connected to said transmitting means for combining said first and second phase shifted carriers to provide a resultant phase shifted carrier having a determined frequency of repetition to said transmitting means for transmission via wireless.